May 30, 1961 — A. E. SCHMID — 2,986,412
QUICK-COUPLING CLEVIS PIPE JOINT
Filed Dec. 12, 1958
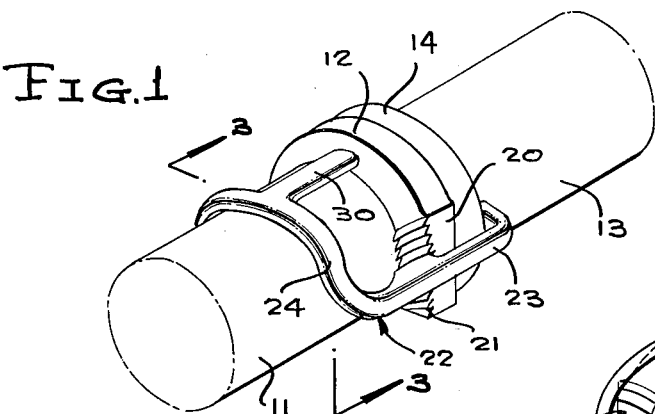
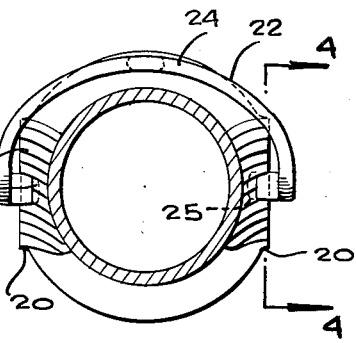
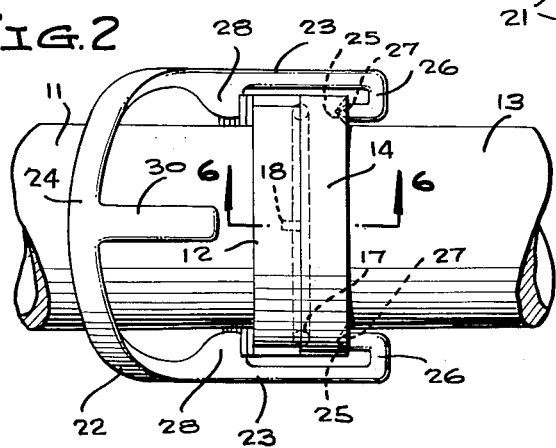
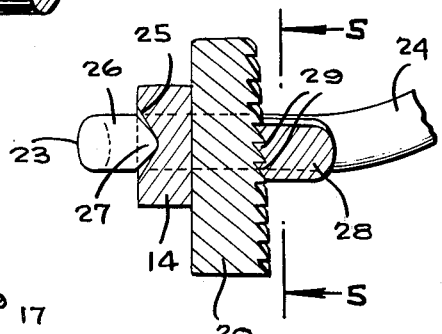
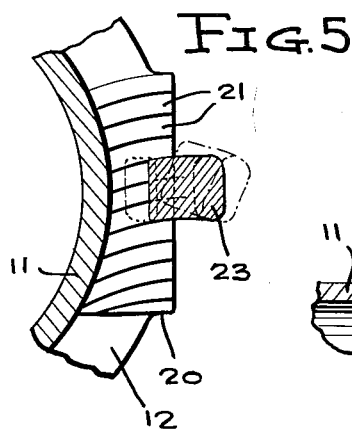
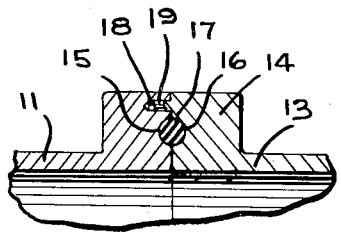
INVENTOR.
ARVIN E. SCHMID United States Patent Office 2,986,412
Patented May 30, 1961

2,986,412
QUICK-COUPLING CLEVIS PIPE JOINT
Arvin E. Schmid, 22652 Burbank Blvd.,
Woodland Hills, Calif.
Filed Dec. 12, 1958, Ser. No. 780,097
2 Claims. (Cl. 285—364)

This invention relates to conduit couplings, and more particularly to means for connecting a pair of flanged pipe sections.

A main object of the invention is to provide a novel and improved means for connecting a pair of flanged pipe sections, said means being simple in construction, being easy to operate, and enabling a sealed and mechanically secure coupling to be achieved between a pair of flanged pipe sections rapidly and with a relatively small amount of effort.

A further object of the invention is to provide an improved pipe coupling structure which involves inexpensive components, which is durable, which is easy to operate, and which may be readily reversed in position to release the connected pipes when desired.

Other objects and advantages of the invention will become apparent from the following description and claims, and from the accompanying drawings, wherein:

Figure 1 is a perspective view of a pair of flanged pipe sections connected together by means of an improved coupling assembly according to the present invention.

Figure 2 is a top plan view of the structure illustrated in Figure 1.

Figure 3 is an enlarged transverse vertical cross sectional view taken substantially on the line 3—3 of Figure 1.

Figure 4 is an enlarged cross sectional detail view taken on the line 4—4 of Figure 3.

Figure 5 is a cross sectional detail view taken on the line 5—5 of Figure 4.

Figure 6 is an enlarged cross sectional detail view taken on the line 6—6 of Figure 2.

Referring to the drawings, 11 designates a first pipe section formed with a coupling flange 12, and 13 designates a second pipe section formed with a coupling flange 14 adapted to be placed substantially in abutting engagement with the coupling flange 12 of the first pipe section 11. The respective flanges 12 and 14 are formed with registrable annular grooves 15 and 16 adapted to receive a sealing ring 17 of suitable resilient deformable material therebetween, as shown in Figure 6, to provide a sealed joint between the flanges. The flange 12 is further formed with one or more guide recesses 18 adapted to receive axially extending aligning pins 19 provided on the flange 14 for the purpose of holding the flanges 12 and 14 in accurate registry and to insure that the sealing ring 17 will be properly seated in the opposing annular grooves 15 and 16.

The flange 12 is formed with diametrically opposing enlarged side portions 20, 20, and said side portions are formed with respective sets of upwardly and outwardly inclined arcuate ratchet teeth 21, the teeth 21 being formed on the external surfaces of the enlarged side flange portions 20, 20, namely, the surfaces opposite to the front sealing surface of the flange containing the groove 15.

Designated generally at 22 is a clevis member, said clevis member being generally U-shaped and having the respective side arms 23, 23 and the bight portion 24, said bight portion being arcuately curved around an axis substantially coplanar with and located midway between and parellel to the side arms 23, 23. Thus, the radius of curvature of the bight member 24 is slightly larger than the radius of the pipe section 11, so that the bight portion 24 may be supportingly engaged on the external surface of the pipe section 11 in the manner illustrated in Figure 1. In this position, the side arms 23, 23 are located parallel to opposite sides of the pipe section 11 and parallel to and spaced equal distances from the axis of the pipe section.

The end flange 14 of pipe section 13 is formed on its rear surface, namely, the surface opposite to that containing the annular groove 16, with diametrically opposed, generally conical recesses 25, 25. The side arms 23, 23 are formed with reversely turned hook members 26, 26, said hook members terminating in tapered conical pivot elements 27, 27 engaging in the conical recesses 25, 25. Side arms 23, 23 are formed at their intermediate portions with inwardly extending lug elements 28, 28, said lug elements being formed with ratchet teeth 29 lockingly engageable with the arcuately curved ratchet teeth 21 and cooperating wedgingly therewith to exert clamping force on the enlarged members 20, 20 as the clevis member 22 is rotated downwardly toward the final locking position thereof illustrated in Figures 1, 2 and 3.

As shown in Figure 4, the ratchet teeth 29 are formed on the rear surfaces of the lugs 28, namely, the surfaces opposing the pivot elements 27 of hook members 26, so that the lug elements 28 cooperate with the hook elements 26 to clamp the abutting flanges 12 and 14 therebetween and to exert compressive force on the sealing gasket 17 disposed in the opposing annular grooves 15 and 16 of the flanges.

Bight member 24 is formed at its intermediate portion with a rearwardly extending arm 30, said arm extending parallel to the side arms 23 but being offset therefrom, as is clearly shown in Figure 1. The arm 30 is employed as an actuating handle for manipulating the clevis member 22, either to clamp the abutting pipe flanges 12 and 14 together or to release the joint. The side arms 23, 23 are sufficiently resilient to flex torsionally both when the joint is being tightened, namely, when the clevis member 22 is rotated downwardly from an upstanding position to the position thereof illustrated in Figures 1, 2 and 3, and also when the clevis member 22 is pulled upwardly from the position shown in Figures 1, 2 and 3 to a released upstanding position. Thus, as shown in Figure 5, the side arms 23 may twist sufficiently as the bight member 22 is being elevated to allow the lugs 28, 28 to disengage from the arcuate, upwardly and outwardly inclined ratchet teeth 21, whereby the clevis member 22 may be disengaged from the ratchet teeth 21 by exerting manual upward force on the handle element 30.

As will be readily apparent from the foregoing description, in order to connect a pair of flanged pipe sections 11 and 13, it is merely necessary to engage the pivot elements 27 of the clevis member 22 in the recesses 25 of the flange 14, with the flange 12 in abutment with the flange 14 and registered therewith. The clevis member 22 is then rotated downwardly to cause the ratchet teeth 29 of the lug elements 28 to cammingly engage with the enlarged portions 20 and to interlock with the ratchet teeth 21 thereon. The clevis member 22 is rotated downwardly until it reaches a limiting position wherein the bight member 24 engages the surface of the pipe section 11, in which position the sections are clamped together, completing the connection. To detach the sections, it is merely necessary to exert an upward force on the handle member 30, whereby the side arms 23 twist sufficiently to allow the ratchet teeth 29 to disengage from the ratchet teeth 21, whereby the side arms 23 flex torsionally, as shown in dotted view in Figure 5, and whereby the clevis member 22 may be lifted to an upstanding position in which the flanges 12 and 14 are released from each other.

It will be understood that the sealing ring 17 is disposed between the opposing annular grooves 15 and 16 prior to the fastening together of the pipe flanges 12 and 14 in the manner above described.

As shown in Figure 4, the enlarged members 20 on the flange 12 are generally wedge-shaped, increasing downwardly in thickness, so that the clamping force will be increased as the lug members 28 are moved downwardly along the enlarged locking portions 20 of the pipe flange 12.

While a specific embodiment of an improved pipe coupling assembly has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a pipe coupling, a first pipe section having an end flange having a transversely extending front annular sealing surface, and having a transversely extending rear surface, ratchet teeth on opposing portions of the rear surface of said flange, a second pipe section having a transversely extending end flange engageable substantially in abutting relation with said first-named flange, said second-named end flange having an abutment surface adjacent said first-named flange and an opposite surface remote from said first-named flange, a clevis member having torsionally flexible side arms and a bight portion, means on the ends of said side arms pivotally engageable with said opposite surface of said second-named end flange, inwardly extending lug elements on said side arms located a sufficient distance from said ends of the side arms to at times engage said transversely extending rear surface whereby to clamp the end flanges together, and serrations on said lug elements lockingly engageable with said ratchet teeth.

2. In a pipe coupling, a first pipe section having an end flange having a transversely extending front annular sealing surface and having a transversely extending rear surface, upwardly and outwardly inclined ratchet teeth on opposing portions of said rear surface of said flange, a second pipe section having a transversely extending end flange engageable substantially in abutting relation with said first-named flange, said second-named end flange having an abutment surface adjacent said first-named flange and an opposite surface remote from said first-named flange, a clevis member having torsionally flexible side arms and a bight portion, means on the ends of said side arms pivotally engageable with said opposite surface of said second-named end flange, inwardly extending lug elements on said side arms located a sufficient distance from said ends of the side arms to at times engage said transversely extending rear surface, whereby to clamp the end flanges together, and serrations on said lug elements lockingly engageable with said ratchet teeth, said side arms being sufficiently resilient to flex torsionally when upward force is applied to said bight portion to allow said serrations to disengage from said ratchet teeth.

References Cited in the file of this patent

UNITED STATES PATENTS

| | | |
|---|---|---|
| 81,396 | Mitchell | Aug. 25, 1868 |
| 303,075 | Towne | Aug. 5, 1884 |
| 724,390 | Hinschell | Mar. 31, 1903 |
| 764,347 | Carlson | July 5, 1904 |
| 817,818 | Tredtin | Apr. 17, 1906 |
| 1,477,440 | Grier | Dec. 11, 1923 |